United States Patent
Yasunaga et al.

(10) Patent No.: US 10,870,755 B2
(45) Date of Patent: Dec. 22, 2020

(54) METHOD FOR PRODUCING THERMOPLASTIC AROMATIC POLYSULFONE RESIN, METHOD FOR PRODUCING EPOXY COMPOSITION, AND METHOD FOR PRODUCING CURED EPOXY PRODUCT

(71) Applicant: Sumitomo Chemical Company, Limited, Tokyo (JP)

(72) Inventors: Tomokazu Yasunaga, Ichihara (JP); Shinji Ohtomo, Tsukuba (JP); Toshiaki Sugimura, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 80 days.

(21) Appl. No.: 15/778,282

(22) PCT Filed: Sep. 14, 2016

(86) PCT No.: PCT/JP2016/077140
§ 371 (c)(1),
(2) Date: May 23, 2018

(87) PCT Pub. No.: WO2017/094319
PCT Pub. Date: Jun. 8, 2017

(65) Prior Publication Data
US 2018/0346710 A1    Dec. 6, 2018

(30) Foreign Application Priority Data
Dec. 2, 2015    (JP) .................................. 2015-235571

(51) Int. Cl.
*C08L 63/00*    (2006.01)
*C08G 75/23*    (2006.01)
(Continued)

(52) U.S. Cl.
CPC .............. *C08L 63/00* (2013.01); *C08G 59/62* (2013.01); *C08G 65/40* (2013.01);
(Continued)

(58) Field of Classification Search
CPC ....... C08J 2381/06; C08J 5/18; C08G 75/205; C08G 75/23; C08G 65/40; G01N 2030/486; C08L 81/06
See application file for complete search history.

(56) References Cited

U.S. PATENT DOCUMENTS

| 5,212,278 A | 5/1993 | Pfaendner et al. |
| 6,437,080 B1 * | 8/2002 | McGrail ............ C08G 65/4093 528/171 |

(Continued)

FOREIGN PATENT DOCUMENTS

| CA | 2054125 A1 | 4/1992 |
| CA | 2059709 A1 | 7/1992 |

(Continued)

OTHER PUBLICATIONS

Int'l Search Report dated Nov. 15, 2016 in Int'l Application No. PCT/JP2016/077140.

(Continued)

*Primary Examiner* — Shane Fang
(74) *Attorney, Agent, or Firm* — Panitch Schwarze Belisario & Nadel LLP

(57) ABSTRACT

The present invention relates to a method for producing thermoplastic aromatic polysulfone resin, in which a polymerization reaction is performed in an organic solvent by using compound (A), a dihalogeno compound represented by Formula (I), compound (B), a divalent phenol represented by Formula (II), and compound (C), an alkali metal carbonate, at a charging molar ratio satisfying the following (Continued)

Formulae (1) to (3): (1) $0.900<(A)/(B)<0.990$; (2) $\{(A)/(B)\}-0.02<(C)/(B)<\{(A)/(B)\}+0.01$; and (3) $(C)/(B)<1.00$,

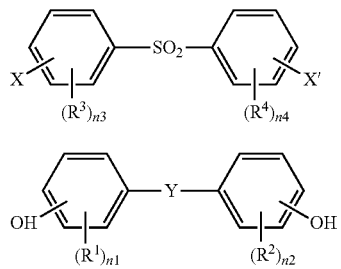

(II)

In Formulae (I) and (II), $R^1$ to $R^4$ represent an alkyl group having 1 to 4 carbon atoms or an alkoxy group having 1 to 4 carbon atoms, X and X' represent a halogen atom, Y represents one or more groups selected from the group consisting of —$SO_2$—, —$C(CH_3)_2$—, —$CH_2$—, —O— and —CO—, or a single bond, and n1, n2, n3 and n4 represent an integer of 0 to 4.

6 Claims, 1 Drawing Sheet (51) Int. Cl.
| | |
|---|---|
| *C08G 65/40* | (2006.01) |
| *C08G 59/62* | (2006.01) |
| *C08J 3/11* | (2006.01) |
| *C08L 81/06* | (2006.01) |

(52) U.S. Cl.
CPC ......... *C08G 65/4056* (2013.01); *C08G 75/23* (2013.01); *C08J 3/11* (2013.01); *C08L 81/06* (2013.01)

(56) References Cited

U.S. PATENT DOCUMENTS

| | | | |
|---|---|---|---|
| 6,562,935 | B1 | 5/2003 | Harada |
| 2011/0224386 | A1* | 9/2011 | Weber .................... C08G 65/48 525/523 |
| 2012/0190764 | A1 | 7/2012 | Kohinata et al. |
| 2018/0057636 | A1 | 3/2018 | Ohtomo et al. |

FOREIGN PATENT DOCUMENTS

| | | |
|---|---|---|
| CN | 101928538 A | 12/2010 |
| CN | 102224185 A | 10/2011 |
| CN | 102482412 A | 5/2012 |
| CN | 103626999 A | 3/2014 |
| EP | 2189487 A1 | 5/2010 |
| JP | S62187764 A | 8/1987 |
| JP | H02117921 A | 5/1990 |
| JP | H02281031 A | 11/1990 |
| JP | H04202432 A | 7/1992 |
| JP | H04266926 A | 9/1992 |
| JP | H04316838 A | 11/1992 |
| JP | 2003138009 A | 5/2003 |
| JP | 2010077185 A | 4/2010 |
| JP | 2010254955 A | 11/2010 |
| JP | 2011094111 A | 5/2011 |
| JP | 2012025847 A | 2/2012 |
| JP | 2012509375 A | 4/2012 |
| JP | 2016008250 A | 1/2016 |
| WO | 2016148133 A1 | 9/2016 |
| WO | 2017135379 A1 | 8/2017 |

OTHER PUBLICATIONS

Office Action and Search Report dated Dec. 15, 2017 in CN Application No. 201680002388.6.
European Search Report No. 16870259.5 dated Jun. 24, 2019.
Office Action dated Jul. 15, 2020 in IN Application No. 201847019595.

* cited by examiner

METHOD FOR PRODUCING THERMOPLASTIC AROMATIC POLYSULFONE RESIN, METHOD FOR PRODUCING EPOXY COMPOSITION, AND METHOD FOR PRODUCING CURED EPOXY PRODUCT

CROSS-REFERENCE TO RELATED APPLICATION

This application is a Section 371 of International Application No. PCT/JP2016/077140, filed Sep. 14, 2016, which was published in the Japanese language on Jun. 8, 2017, under International Publication No. WO 2017/094319 A1, the disclosure of which is incorporated herein by reference in its entirety.

TECHNICAL FIELD

The present invention relates to a method for producing thermoplastic aromatic polysulfone resin, a method for producing an epoxy composition, and a method for producing a cured epoxy product.
Priority is claimed on Japanese Patent Application No. 2015-235571, filed on Dec. 2, 2015, the content of which is incorporated herein by reference.

BACKGROUND ART

Aromatic polysulfone resins are known to have not only high heat resistance, chemical resistance, creep resistance, flame retardancy, and the like, but also favorable adhesion with materials such as metals, glasses, ceramics, and the like, and are used for various applications.
In recent years, it has been found that, in prepreg in which a carbon fiber is impregnated with epoxy resin, which is a matrix resin, toughness is improved by using aromatic polysulfone resin. For aromatic polysulfone resin used for such applications, properties such as molecular weight and terminal composition in consideration of compatibility and reactivity with epoxy resin are required. In particular, the terminal composition, which determines the reactivity with the epoxy resin, is an important factor, and it is known that a phenolic hydroxyl group is preferable.
It is known that, for controlling the terminal composition of the aromatic polysulfone resin, adjustment of a quantitative ratio of an aromatic dihalogeno compound and an aromatic hydroxy compound, which are used as a starting materials, is important. Specifically, in order to increase a hydroxyl group ratio of the terminals, it is known to excessively use an aromatic hydroxy compound as the starting material (refer to PTL 1).
In addition, in recent years, a method of obtaining a sufficient number of phenolic hydroxy terminals by using a polyfunctional carboxylic acid has also been attempted (refer to PTL 2).

CITATION LIST

Patent Documents

[PTL 1] JP2011-94111-A
[PTL 2] JP 2012-509375-T

SUMMARY OF THE INVENTION

Problems to be Solved by the Invention

However, in the invention described in PTL 1, adequate knowledge about the relationship in terms of a quantitative ratio between alkali metal carbonate and the aromatic hydroxy compound with a quantitative ratio between the aromatic dihalogeno compound and the aromatic hydroxy compound, which are used as the starting materials, in order to obtain a sufficient number of a phenolic hydroxy terminal has not been obtained.
In addition, in the invention described in PTL 2, in order to obtain a sufficient number of a phenolic hydroxy terminal, it is required to convert a phenoxy terminal group to a phenolic hydroxy group by adding a polyfunctional carboxylic acid. Therefore, there is a problem in that processes become complicated and simplification of the processes has been required.
The present invention has been made in view of the above problems, and an object thereof is to provide a novel method for producing thermoplastic aromatic polysulfone resin having a high ratio of a phenolic hydroxyl terminal.

Means to Solve the Problems

As a result of extensive studies to achieve the object, the present inventors have found that a thermoplastic aromatic polysulfone resin having sufficient phenolic hydroxy terminals can be produced without adding an acid by adjusting charging amounts of an aromatic hydroxy compound, an aromatic dihalogeno compound, and an alkali metal carbonate such as potassium carbonate, which are used as a starting materials.
In addition, for the aromatic polysulfone resin, a low reduced viscosity for improving handling properties is also required. The present inventors have also found that a thermoplastic aromatic polysulfone resin having not only a high ratio of a phenolic hydroxy terminal but also low reduced viscosity can be produced by adjusting the charging amounts of the aromatic hydroxy compound, the aromatic dihalogeno compound and the alkali metal carbonate, which are used as a starting materials, and completed the present invention.
The present invention includes the following aspects.
A method for producing thermoplastic aromatic polysulfone resin including:
performing polymerization reaction of (A) a dihalogeno compound represented by Formula (I), (B) a divalent phenol compound represented by Formula (II) and (C) an alkali metal carbonate in an organic solvent at a charging molar ratio satisfying the following Formulae (1) to (3):

$$0.900 < (A)/(B) < 0.990 \tag{1}$$

$$\{(A)/(B)\} - 0.02 < (C)/(B) < \{(A)/(B)\} + 0.01 \text{ and} \tag{2}$$

$$(C)/(B) < 1.00, \tag{3}$$

in Formulae (I) and (II), $R^1$ to $R^4$ each independently represents an alkyl group having 1 to 4 carbon atoms or an alkoxy group having 1 to 4 carbon atoms, X and X' each independently represents a halogen atom, Y represents one or more groups selected from the group consisting of —$SO_2$—, —$C(CH_3)_2$—, —$CH_2$—, —O— and —CO—, or a single bond, and n1, n2, n3 and n4 each independently represents an integer of 0 to 4, and in a case where n1, n2, n3 or n4 is an integer of 2 to 4, a plurality of $R^1$, $R^2$, $R^3$ or $R^4$ may be the same as or different from each other.

In Formulae (I) and (II), n1 to n4 are preferably 0.

In Formulae (I) and (II), X and X' are preferably chlorine atoms.

The organic solvent is preferably a polar organic solvent.

In addition, a method for producing an epoxy composition of the present invention includes dissolving the thermoplastic aromatic polysulfone resin produced by the production method in an epoxy compound.

Further, a method for producing a cured epoxy product of the present invention includes curing the epoxy composition obtained by the production method.

That is, the present invention has the following aspects.

[1] A method for producing thermoplastic aromatic polysulfone resin, including:

performing polymerization reaction of (A) a dihalogeno compound represented by Formula (I), (B) a divalent phenol represented by Formula (II) and (C) an alkali metal carbonate in an organic solvent at a charging molar ratio satisfying the following Formulae (1) to (3):

$$0.900 < (A)/(B) < 0.990 \tag{1}$$

$$\{(A)/(B)\} - 0.02 < (C)i(B) < \{(A)/(B)\} + 0.01 \text{ and} \tag{2}$$

$$(C)/(B) < 1.00, \tag{3}$$

in Formulae (I) and (II), $R^1$ to $R^4$ each independently represents an alkyl group having 1 to 4 carbon atoms or an alkoxy group having 1 to 4 carbon atoms, X and X' each independently represents a halogen atom, Y represents one or more groups selected from the group consisting of —$SO_2$—, —$C(CH_3)_2$—, —$CH_2$—, —O— and —CO—, or a single bond, and n1, n2, n3 and n4 each independently represents an integer of 0 to 4, and in a case where n1, n2, n3 or n4 is an integer of 2 to 4, a plurality of $R^1$, $R^2$, $R^3$ or $R^4$ may be the same as or different from each other;

[2] The method according to [1], in which Formula (1) is $0.910 \leq (A)/(B) \leq 0.950$;

[3] The method according to [1], in which Formula (1) is $0.910 \leq (A)/(B) \leq 0.930$;

[4] The method according to any one of [1] to [3], in which n1 to n4 are 0;

[5] The method according to any one of [1] to [4], in which X and X' are chlorine atoms;

[6] The method according to any one of [1] to [5], in which the organic solvent is a polar organic solvent;

[7] A method for producing an epoxy composition, including: dissolving the thermoplastic aromatic polysulfone resin produced by the method according to any one of [1] to [6] in an epoxy compound; and

[8] A method for producing a cured epoxy product, including: curing the epoxy composition obtained by the method according to [7].

Effects of the Invention

According to the present invention, thermoplastic aromatic polysulfone resin having a sufficient number of a phenolic hydroxy group and a low reduced viscosity can be produced without adding a process due to adding an acid or a hydroxyl group conversion process. By using such a thermoplastic aromatic polysulfone resin, in a case of being used with epoxy resin, toughness can be imparted to the epoxy resin.

EMBODIMENTS FOR CARRYING OUT THE INVENTION

<Method for Producing Thermoplastic Polysulfone Resin>

In a method for producing thermoplastic polysulfone resin of the present invention (hereinafter, simply referred to as "production method" in some cases), a polymerization reaction is performed in an organic solvent by using (A) a dihalogeno compound represented by Formula (I), (B) a divalent phenol represented by Formula (II) and (C) an alkali metal carbonate and components (A) to (C) are used in a charging molar ratio satisfying the following Formulae (1) to (3):

$$0.900 < (A)/(B) < 0.990 \tag{1}$$

$$\{(A)/(B)\} - 0.02 < (C)/(B) < \{(A)/(B)\} + 0.01 \text{ and} \tag{2}$$

$$(C)/(B) < 1.00, \tag{3}$$

in Formulae (1), (2) and (3), (A), (B) or (C) each represents the number of moles of each component (A), (B) or (C) charged in the production method, in Formulae (I) and (II), $R^1$ to $R^4$ each independently represents an alkyl group having 1 to 4 carbon atoms or an alkoxy group having 1 to 4 carbon atoms, X and X' each independently represents a halogen atom, Y represents one or more groups selected from the group consisting of —$SO_2$—, —$C(CH_3)_2$—, —$CH_2$—, —O— and —CO—, or a single bond, and n1, n2, n3 and n4 each independently represents an integer of 0 to 4, and in a case where n1, n2, n3 or n4 is an integer of 2 to 4, a plurality of $R^1$, $R^2$, $R^3$ or $R^4$ may be the same as or different from each other.

In the present specification, the expression "components (A) to (C) are used in a charging molar ratio satisfying the following Formulae (1) to (3)" means that components (A) to (C) are subjected to reaction at a charging amount (mol) so as to satisfy Formulae (1) to (3) in the production method of the present invention. Components (A) to (C) may be charged into a reaction system at the same time or components may be charged separately therein. In a case of charging components separately, the order of charging components (A) to (C) is not particularly limited as long as the effect of the present invention is exhibited. In addition, in a case of charging components separately, according to the amount of previously charged component, the amount of component to be charged later may be adjusted to satisfy a predetermined molar ratio.

[(A) Dihalogeno Compound]

(A) A dihalogeno compound (in the present specification, referred to as "component (A)" in some cases) is a compound represented by Formula (I).

In the formula, X and X' each independently represents a halogen atom. Examples of the halogen atom include a chlorine atom, a bromine atom, and an iodine atom. Among these, a chlorine atom is preferable.

When a position number of each carbon atom of a benzene ring skeleton to which the sulfonyl group (—$SO_2$—) is bonded is regarded as a 1-position, X and X' may be bonded to a carbon atom at any of 2-position, 3-position, or 4-position of the benzene ring skeleton; however, they are preferably bonded to the carbon atom at the 4-position. That is, component (A) is preferably bis(4-chlorophenyl) sulfone in which either one or both of $R^3$ and $R^4$ may be bonded instead of a hydrogen atom.

In Formula (I), $R^3$ and $R^4$ each independently represents an alkyl group having 1 to 4 carbon atoms or an alkoxy group having 1 to 4 carbon atoms.

In $R^3$ and $R^4$, the alkyl group may be any of linear, branched, or cyclic; however, it is preferably linear or branched. Examples thereof include a methyl group, an ethyl group, an n-propyl group, an isopropyl group, an n-butyl group, an isobutyl group, a sec-butyl group, and a tert-butyl group. Among these, a methyl group is preferable.

In $R^3$ and $R^4$, the alkoxy group may be any of linear, branched, or cyclic; however, it is preferably linear or branched. Examples thereof include a methoxy group, an ethoxy group, an n-propoxy group, an isopropoxy group, an n-butoxy group, an isobutoxy group, a sec-butoxy group, and a tert-butoxy group. Among these, a methoxy group is preferable.

In Formula (I), n3 is the number of bonds of $R^3$ and n4 is the number of bonds of $R^4$. n3 and n4 each independently represents an integer of 0 to 4.

In a case where the n3 and n4 are an integer other than 0, a bonding position of corresponding $R^3$ or $R^4$ is not particularly limited. When the position number of a carbon atom of the benzene ring skeleton to which the sulfonyl group is bonded is regarded as a 1-position, $R^3$ or $R^4$ may be bonded to a carbon atom at any of 2-position, 3-position, 4-position, 5-position, and 6-position of the benzene ring skeleton with the proviso that the carbon atom to which X or X' is bonded is excluded. The bonding position is preferably a carbon atom other than at the 4-position, and more preferably a carbon atom at either of 3-position or 5-position or both of 3-position and 5-position.

In a case where n3 or n4 is an integer of 2 to 4, a plurality of $R^3$ or $R^4$ may be the same or different from each other. For example, in a case where n3 is an integer of 2 to 4, all of $R^3$ with the number of n3 may be the same or different from each other. In a case where n3 is 3 or 4, only some of $R^3$ may also be the same as each other. $R^4$ with the number of n4 are also the same as $R^3$ with the number of n3.

n3 and n4 are each independently preferably an integer of 0 to 3, more preferably an integer of 0 to 2, further preferably 0 or 1, particularly preferably 0.

Preferred examples of component (A) include bis(4-chlorophenyl) sulfone (also referred to as 4,4'-dichlorodiphenyl sulfone).

[(B) Divalent Phenol]

(B) a divalent phenol (in the present specification, referred to as "component (B)" in some cases) is a compound represented by Formula (II).

In component (B), Y represents one or more groups selected from the group consisting of —$SO_2$—, —$C(CH_3)_2$—, —$CH_2$—, —O— and —CO—, or a single bond. Y may be a group consisting of only one kind of these groups or a combination of two or more kinds thereof. As Y, —$SO_2$— is preferable.

In component (B), when a position number of each carbon atom of a benzene ring skeleton to which the sulfonyl group is bonded is regarded as a 1-position, two hydroxyl groups (—OH) may be bonded to a carbon atom at any of 2-position, 3-position, or 4-position of the benzene ring skeleton; however, they are preferably bonded to the carbon atom at the 4-position. That is, component (B) is preferably bis(4-hydroxyphenyl) sulfone in which any one or both of $R^1$ and $R^2$ may be bonded instead of a hydrogen atom (also referred to as 4,4'-dihydroxydiphenyl sulfone).

In Formula (II), $R^1$ and $R^2$ each independently represents an alkyl group having 1 to 4 carbon atoms or an alkoxy group having 1 to 4 carbon atoms. In $R^1$ and $R^2$, examples of the alkyl group having 1 to 4 carbon atoms or the alkoxy group having 1 to 4 carbon atoms include the same groups as those exemplified in the description of $R^3$ and $R^4$.

In addition, n1 is the number of bonds of $R^1$ and n2 is the number of bonds of $R^2$, and each independently represents an integer of 0 to 4.

In a case where the n1 and n2 are an integer other than 0, a bonding position of corresponding $R^1$ or $R^2$ is not particularly limited. When the position number of a carbon atom of the benzene ring skeleton to which the sulfonyl group is bonded is regarded as a 1-position, $R^1$ or $R^2$ may be bonded to a carbon atom at any of 2-position, 3-position, 4-position, 5-position and 6-position of the benzene ring skeleton with the proviso that the carbon atom to which a hydroxyl group is bonded is excluded. The bonding position is preferably a carbon atom other than at the 4-position, and more preferably a carbon atom at either of 3-position or 5-position or both of 3-position and 5-position.

In a case where n1 or n2 is an integer of 2 to 4, a plurality of $R^1$ or $R^2$ may be the same or different from each other. For example, in a case where n1 is an integer of 2 to 4, all of $R^1$ with the number of n1 may be the same or different from each other. In a case where n1 is 3 or 4, only some of $R^1$ may also be the same as each other. $R^2$ with the number of n2 are also the same as $R^1$ with the number of n1.

n1 and n2 are each independently preferably an integer of 0 to 3, more preferably an integer of 0 to 2, further preferably 0 or 1, particularly preferably 0.

In an aspect of the present invention, as component (B), bis(4-hydroxyphenyl) sulfone (also referred to as 4,4'-dihydroxydiphenyl sulfone) and bis(4-hydroxy-3,5-dimethylphenyl) sulfone are preferable.

That is, the thermoplastic aromatic polysulfone resin obtained by the production method of the present invention preferably has a repeating unit represented the following formula (III) or (IV).

(III)

(IV)

[(C) Alkali Metal Carbonate]

(C) An alkali metal carbonate (in the present specification, referred to as "component (C)" in some cases) may be an alkali carbonate (that is, a carbonate of alkali metal), which is a normal salt, may be an alkali bicarbonate (also referred to as an alkali hydrogen carbonate or an alkali metal hydrogen carbonate), which is an acid salt, or may also be a mixture of these (that is, the alkali carbonate and the alkali bicarbonate).

Preferred examples of the alkali carbonate include sodium carbonate and potassium carbonate.

Preferred examples of the alkali bicarbonate include sodium bicarbonate (also referred to as sodium hydrogen carbonate) and potassium bicarbonate (also referred to as potassium hydrogen carbonate).

(Polymerization)

In the method for producing thermoplastic aromatic polysulfone resin of the present invention, a polymerization reaction is performed in an organic solvent using the above-described components (A), (B) and (C) at a charging molar ratio shown below:

$$0.900 < (A)/(B) < 0.990 \quad (1)$$

$$\{(A)/(B)\} - 0.02 < (C)/(B) < \{(A)/(B)\} + 0.01 \text{ and} \quad (2)$$

$$(C)/(B) < 1.00. \quad (3)$$

Specifically, a usage amount (that is, a charging amount (mol)) of component (A) is more than 90 mol % and less than 99 mol % (that is, when Formula (1) is $0.900 < (A)/(B) < 0.990$), preferably 91 to 97 mol % (that is, when Formula (1) is $0.910 \leq (A)/(B) \leq 0.970$), more preferably 91 to 95 mol % (that is, when Formula (1) is $0.910 \leq (A)/(B) \leq 0.950$), and further preferably 91 to 93 mol % (that is, when Formula (1) is $0.910 \leq (A)/(B) \leq 0.930$), with respect to a usage amount (that is, a charging amount (mol)) of component (B).

The polymerization reaction targeted in the production method of the present invention is dehalogenation polycondensation of components (A) and (B). If a side reaction does not occur, as the molar ratio of both becomes closer to 1:1, that is, as the usage amount of component (A) becomes closer to 100 mol % with respect to usage amount of component (B), the degree of polymerization of the obtained thermoplastic aromatic polysulfone resin increases. As a result, the reduced viscosity of the thermoplastic aromatic polysulfone resin increases and Mw/Mn tends to decrease.

However, a side reaction such as a substitution reaction of a halogen atom to a hydroxyl group or depolymerization occurs due to an alkali hydroxide or the like created as a by-product. Due to such a side reaction, a degree of polymerization of the obtained thermoplastic aromatic polysulfone resin is reduced. Therefore, in consideration of the degree of the side reaction, component (A) is required to be adjusted so as to obtain a thermoplastic aromatic polysulfone resin having a predetermined reduced viscosity and Mw/Mn.

On the other hand, in the production method of the present invention, a thermoplastic aromatic polysulfone resin having low reduced viscosity and a desired Tg according to a suitable Mw/Mn can be obtained by setting the usage amount of component (A) to satisfy the above relational Formulae (1) to (3).

In the present specification, Mw represents a weight-average molecular weight and Mn represents a number-average molecular weight. The weight-average molecular weight and the number-average molecular weight are values obtained by, for example, averaging measured values measured twice using gel permeation chromatography (GPC) analysis. In addition, Mw/Mn can be calculated from the weight-average molecular weight (Mw) and the number-average molecular weight (Mn) obtained as the average values. Mw/Mn may also be referred to as polydispersity in some cases.

In the present specification, the reduced viscosity can be measured by a method described in Examples to be described later.

In the present specification, Tg represents a glass transition temperature. The glass transition temperature can be determined by measuring DSC. The thermoplastic aromatic polysulfone resin obtained by the production method of the present invention has, for example, a glass transition temperature of 205° C. to 225° C.

In addition, a usage amount (that is, a charging amount (mol)) of component (C) is less than 100 mol % (that is, when Formula (3) is (C)/(B)<1.00), preferably 90 to 99 mol % (that is, when Formula (3) is $0.900 \leq (C)/(B) \leq 0.990$), more preferably 90 to 97 mol % (that is, when Formula (3) is $0.900 \leq (C)/(B) \leq 0.970$), further preferably 91 to 95 mol % (that is, when Formula (3) is $0.910 \leq (C)/(B) \leq 0.950$), still further preferably 91 to 94 mol % (that is, when Formula (3) is $0.910 \leq (C)/(B) \leq 0.940$), and particularly preferably 91 to 93 mol % (that is, when Formula (3) is $0.910 \leq (C)/(B) \leq 0.930$), with respect to a usage amount (that is, a charging amount (mol)) of component (B).

In the production method of the present invention, if the side reaction does not occur, as the usage amount of component (C) increases, that is, the usage amount of component (C) is larger than the usage amount of component (B), the targeted polycondensation reaction proceeds promptly. Therefore, the work efficiency improves.

However, a depolymerization reaction is likely to occur due to the presence of excess component (C) in a polymerization reaction liquid. As a result, an aromatic polysulfone resin having an alkali terminal instead of the desired phenolic hydroxy terminal is formed. For example, in a case of using the potassium carbonate as the alkali metal carbonate, an aromatic polysulfone resin having an OK terminal is likely to be formed. After the polymerization reaction, in order to convert the terminal of the aromatic polysulfone resin from the OK terminal (alkali terminal) to an OH terminal (phenolic hydroxy terminal), neutralization treatment is further required, and there is a concern of a decrease of productivity. Therefore, the usage amount of component (C) is required to be adjusted so as to obtain a aromatic polysulfone resin having many phenolic hydroxy groups.

On the other hand, in the production method of the present invention, as a result of suppressing the formation of the alkali terminal due to the depolymerization reaction by setting the usage amount of component (C) to satisfy the above relational Formulae (1) to (3), the thermoplastic aromatic polysulfone resin having many phenolic hydroxy terminals can be obtained without carrying out a neutralization reaction.

In addition, in the production method of the present invention, the charging ratio of components (A) to (C) satisfies "$\{(A)/(B)\}-0.02<(C)/(B)<\{(A)/(B)\}+0.01$", more preferably satisfies "$\{(A)/(B)\}-0.01<(C)/(B)<\{(A)/(B)\}+0.01$", further preferably satisfies "$\{(A)/(B)\}-0.005<(C)/(B)<\{(A)/(B)\}+0.005$", and particularly preferably satisfies "$\{(A)/(B)\}-0.001<(C)/(B)<\{(A)/(B)\}+0.005$".

A depolymerization reaction is likely to occur also when the usage ratio of component (A) to component (B) and the usage ratio of component (C) to component (B) are lost touch with each other. As a result, an aromatic polysulfone resin having an alkali terminal is likely to be formed.

On the other hand, in the production method of the present invention, as a result of suppressing the formation of the alkali terminal due to the depolymerization reaction by setting the usage amounts of components (A) to (C) to satisfy the above relational Formulae (1) to (3), a thermoplastic aromatic polysulfone resin having many phenolic hydroxy terminals can be obtained without carrying out a neutralization reaction.

In one aspect of the present invention, a method for producing thermoplastic aromatic polysulfone resin is provided in which a polymerization reaction is carried out in an organic solvent by using components (A), (B) and (C) at a charging molar ratio shown below:

$$0.910 \leq (A)/(B) \leq 0.950 \tag{1}$$

$$\{(A)/(B)\}-0.02<(C)(B)<\{(A)/(B)\}+0.01 \text{ and} \tag{2}$$

$$(C)/(B)<1.00. \tag{3}$$

In another aspect of the present invention, a method for producing thermoplastic aromatic polysulfone resin is provided in which a polymerization reaction is carried out in an organic solvent by using components (A), (B) and (C) at a charging molar ratio shown below:

$$0.910 \leq (A)/(B) \leq 0.930 \tag{1}$$

$$\{(A)/(B)\}-0.02<(C)/(B)<\{(A)/(B)\}+0.01 \text{ and} \tag{2}$$

$$(C)/(B)<1.00. \tag{3}$$

In still another aspect of the present invention, a method for producing thermoplastic aromatic polysulfone resin is provided in which a polymerization reaction is carried out in an organic solvent by using components (A), (B) and (C) at a charging molar ratio shown below:

$$0.900<(A)/(B)<0.990 \tag{1}$$

$$\{(A)/(B)\}-0.02<(C)/(B)<\{(A)/(B)\}+0.01 \text{ and} \tag{2}$$

$$0.910 \leq (C)/(B) \leq 0.950. \tag{3}$$

In still another aspect of the present invention, a method for producing thermoplastic aromatic polysulfone resin is provided in which a polymerization reaction is carried out in an organic solvent by using components (A), (B) and (C) at a charging molar ratio shown below:

$$0.900<(A)/(B)<0.990 \tag{1}$$

$$\{(A)/(B)\}-0.02<(C)/(B)<\{(A)/(B)\}+0.01 \text{ and} \tag{2}$$

$$0.910 \leq (C)/(B) \leq 0.940. \tag{3}$$

In still another aspect of the present invention, a method for producing thermoplastic aromatic polysulfone resin is provided in which a polymerization reaction is carried out in an organic solvent by using components (A), (B) and (C) at a charging molar ratio shown below:

$$0.910 \leq (A)/(B) \leq 0.930 \tag{1}$$

$$\{(A)/(B)\}-0.02<(C)/(B)<\{(A)/(B)\}+0.01 \text{ and} \tag{2}$$

$$0.910 \leq (C)/(B) \leq 0.940. \tag{3}$$

In still another aspect of the present invention, a method for producing thermoplastic aromatic polysulfone resin is provided in which a polymerization reaction is carried out in an organic solvent by using components (A), (B) and (C) at a charging molar ratio shown below:

$$0.900<(A)/(B)<0.99 \tag{1}$$

$$\{(A)/(B)\}-0.02<(C)/(B)<\{(A)/(B)\}+0.01 \text{ and} \tag{2}$$

$$(C)/(B)<1.00. \tag{3}$$

However, cases where (A)/(B) is 0.940, 0.962, 0.970, and 0.979 are excluded therefrom.

The organic solvent used for the polymerization reaction is preferably a polar organic solvent.

Examples of the polar organic solvent include dimethyl sulfoxide, 1-methyl-2-pyrrolidone, sulfolane (also referred to as 1,1-dioxothiolane), 1,3-dimethyl-2-imidazolidinone, 1,3-diethyl-2-imidazolidinone, dimethyl sulfone, diethyl sulfone, diisopropyl sulfone, and diphenyl sulfone. Among these, diphenyl sulfone is preferable.

The reduced viscosity of the thermoplastic aromatic polysulfone resin obtained by the production method of the present invention is preferably 0.18 dL/g or higher and more preferably 0.22 to 0.28 dL/g. In the thermoplastic aromatic polysulfone resin, as the reduced viscosity increases, heat resistance or strength and rigidity tend to increase; however, when the reduced viscosity is excessively high, the melting temperature and melt viscosity are likely to increase and flowability is likely to decrease.

In the thermoplastic aromatic polysulfone resin obtained by the production method of the present invention, Mn is preferably 5000 to 13000 and more preferably 8000 to 12000.

In the thermoplastic aromatic polysulfone resin obtained by the production method of the present invention, a value of Mw/Mn (also referred to as polydispersity) is 1.8 or smaller, preferably smaller than 1.8, more preferably 1.79 or smaller, further preferably 1.77 or smaller, and particularly preferably 1.75 or smaller. By adjusting the charging ratio such that the value of Mw/Mn is the upper limit value or smaller, the obtained thermoplastic aromatic polysulfone resin achieves high heat resistance.

In the thermoplastic aromatic polysulfone resin of the present invention, the value of Mw/Mn is, for example, 1.6 to 1.8, more preferably 1.6 or greater and smaller than 1.8, more preferably 1.6 to 1.79, further preferably 1.6 to 1.77, and particularly preferably 1.6 to 1.75.

The expression "high heat resistance" means that when determining the temperature at the time when 10 mg of a sample of the aromatic polysulfone resin is heated to 800° C. at a heating rate of 10° C./min and burned, and the weight of the sample has decreased by 5%, based on 200° C., from a thermogravimetric curve (TGA curve) obtained at this time, that is, a 5% weight loss temperature (° C.), the 5% weight loss temperature of the aromatic polysulfone resin is preferably 498° C. or higher and more preferably 499° C. or higher. The 5% weight loss temperature serves as an index with which a degree of heat resistance of the aromatic polysulfone resin, and in general, as the temperature increases, the aromatic polysulfone resin improves in terms of heat resistance. For measuring the weight loss temperature of the aromatic polysulfone resin, for example, "TGA-50" manufactured by Shimadzu Corporation can be used as a measuring device.

In a typical method for producing thermoplastic aromatic polysulfone resin, as a first step, components (A) and (B) are dissolved in an organic solvent, as a second step, an alkali metal carbonate is added to the solution obtained in the first step to polycondensate components (A) and (B), and as a third step, thermoplastic aromatic polysulfone resin can be obtained by removing an unreacted alkali metal carbonate, an alkali halide created as a by-product, and the organic solvent from the reaction mixture obtained in the second step.

The usage amount of organic solvent used in the first step may be, for example, an amount capable of dissolving components (A) and (B) at 40° C. to 180° C., and for example, it is possible to use an excessive amount of the organic solvent, preferably 1.4 to 3.2 moles, and more preferably 1.9 to 2.5 moles of the organic solvent with respect to 1 mol of component (A).

The dissolution temperature of the first step is usually 40° C. to 180° C. In addition, the polycondensation temperature in the second step is usually 180° C. to 400'C. If a side reaction does not occur, as the polycondensation temperature increases, the targeted polycondensation proceeds promptly, thereby increasing the degree of polymerization of the obtained aromatic polysulfone resin. As a result, in the aromatic polysulfone resin, the reduced viscosity increases, Mn increases, and Mw/Mn tends to decrease. However, as the polycondensation temperature increases, the same side reaction as above is likely to occur. Due to the side reaction, the degree of polymerization of the obtained aromatic polysulfone resin is reduced. Therefore, in consideration of the degree of a side reaction, the polycondensation temperature is required to be adjusted so as to obtain a thermoplastic aromatic polysulfone resin having a predetermined reduced viscosity, Mn, and Mw/Mn.

In addition, the polycondensation in the second step may be carried out in such a manner that the temperature is gradually raised while removing water created as a by-product, the temperature reaches a reflux temperature of the polar organic solvent, and then the temperature is further maintained for preferably 1 to 50 hours and more preferably 2 to 30 hours. If a side reaction does not occur, as the polycondensation time increases, the targeted polycondensation proceeds, thereby increasing the degree of polymerization of the obtained aromatic polysulfone resin. As a result, in the aromatic polysulfone resin, the reduced viscosity increases, Mn increases, and Mw/Mn tends to decrease. However, as the polycondensation time increases, the same side reaction as above is likely to occur. Due to the side reaction, the degree of polymerization of the obtained aromatic polysulfone resin is reduced. Therefore, in consideration of the degree of the side reaction, the polycondensation time is required to be adjusted so as to obtain a thermoplastic aromatic polysulfone resin having a predetermined reduced viscosity, Mn, and Mw/Mn.

In the third step, first, a solution in which thermoplastic aromatic polysulfone resin is dissolved in an organic solvent is obtained by removing an unreacted alkali metal carbonate and an alkali halide created as a by-product from the reaction mixture obtained in the second step, by filtration, extraction, centrifugation, or the like. Then, thermoplastic aromatic polysulfone resin is obtained by removing the organic solvent from the solution. Removal of the organic solvent may be carried out in such a manner that the organic solvent is directly distilled from the solution or may be carried out in such a manner that the solution is mixed with a poor solvent of thermoplastic aromatic polysulfone resin to precipitate the thermoplastic aromatic polysulfone resin, thereby being separated by filtration, centrifugation, or the like.

Examples of the poor solvent of thermoplastic aromatic polysulfone resin include methanol, ethanol, 2-propanol, hexane, heptane, and water. Since it is easy to remove, methanol is preferable.

In addition, in a case of using an organic solvent having a relatively high melting point as the polymerization solvent, a thermoplastic aromatic polysulfone resin may also be obtained in such a manner that the reaction mixture obtained in the second step is cooled and solidified, and then pulverized, an unreacted alkali metal carbonate and an alkali halide created as a by-product are extracted and removed from the obtained powders using water, and the organic solvent is extracted and removed using a solvent in which the thermoplastic aromatic polysulfone resin is not dissolved and the organic solvent is dissolved (uniformly mixed).

A volume-average particle diameter of the powder is preferably 200 to 2000 μm, more preferably 250 to 1500 μm, and further preferably 300 to 1000 μm from the viewpoint of extraction efficiency and workability at the time of extraction. By setting the volume-average particle diameter of the powder to the lower limit value or larger, consolidation at the time of extraction or clogging at the time of performing filtration or drying after extraction is highly suppressed. In addition, by setting the volume-average particle diameter of the powder to the upper limit value or smaller, the extraction efficiency further increases.

In the present specification, the volume-average particle diameter is obtained by measuring particle size distribution using a laser diffraction scattering particle size distribution measuring apparatus ("Mastersizer 2000" manufactured by Malvern Panalytical Ltd).

For example, in a case where diphenyl sulfone is used as a polymerization solvent, examples of the extraction solvent include a mixed solvent of acetone and methanol. A mixing ratio of acetone and methanol is usually determined from the viewpoints of extraction efficiency and fixability of powder of aromatic polysulfone resin.

In addition, in another typical method for producing thermoplastic aromatic polysulfone resin, as a first step, component (B) and an alkali metal carbonate are subjected to reaction in an organic solvent to remove water created as a by-product, as a second step, component (A) is added to the reaction mixture obtained in the first step to perform polycondensation, and as a third step, thermoplastic aromatic polysulfone resin can be obtained by removing an unreacted alkali metal carbonate, an alkali halide created as a by-product, and the organic solvent from the reaction mixture obtained in the second step, in the same fashion as the previously described method.

In this alternative method, in the first step, in order to remove water created as a by-product, azeotropic dehydration may be carried out by adding an organic solvent azeotropic with water. Examples of the organic solvent azeotropic with water include benzene, chlorobenzene, toluene, methyl isobutyl ketone, hexane, and cyclohexane. The temperature of azeotropic dehydration is preferably 70° C. to 200° C.

In addition, in this alternative method, the reaction temperature in the polycondensation of the second step is preferably 40° C. to 180'C. In the same fashion as the previously described method, in consideration of the degree of the side reaction, the polycondensation temperature and the polycondensation time are required to be adjusted so as to obtain a thermoplastic aromatic polysulfone resin having a predetermined reduced viscosity, Mn, and Mw/Mn.

According to the production method of the present invention, a thermoplastic aromatic polysulfone resin having a phenolic hydroxy terminal at a high ratio and having a low reduced viscosity can be simply obtained without a process such as neutralization. Since the obtained thermoplastic aromatic polysulfone resin has a phenolic hydroxy terminal at a high ratio, reactivity at the time of reacting with epoxy resin in the prepreg or the like can increase and favorable toughness can be imparted to the epoxy resin. In addition, the aromatic polysulfone resin achieves favorable handling property due to the low reduced viscosity.

In one aspect of the present invention, a method for producing thermoplastic aromatic polysulfone resin is provided in which the number of terminal hydroxyl groups is 160 μmol/g or more, preferably 160 to 320 μmol/g, more preferably 170 to 320 μmol/g, and further preferably 240 to 320 μmol/g.

In another aspect of the present invention, a method for producing thermoplastic aromatic polysulfone resin is provided in which the number of terminal hydroxyl groups is 160 μmol/g or more, preferably 160 to 320 μmol/g, more preferably 170 to 320 μmol/g, and further preferably 240 to 320 μmol/g and the reduced viscosity is 0.28 dL/g or lower and preferably 0.18 to 0.28 dL/g.

In the present specification, the number of terminal hydroxyl groups of the thermoplastic aromatic polysulfone resin can be expressed by an existing amount (number of moles) of the phenolic hydroxy terminal with respect to the unit weight (1 g) of the thermoplastic aromatic polysulfone resin, and can be measured by the method described in Examples to be described later. That is, the number of terminal hydroxyl groups can be determined in such a manner that a specific amount (g) of thermoplastic aromatic polysulfone resin is dissolved in dimethyl formamide, an excess amount of p-toluene sulfonic acid is added thereto, titration is performed with 0.05 mol/L of potassium methoxideitoluene-methanol solution using a potentiometric titrator to neutralize residual p-toluene sulfonic acid, and then hydroxyl groups are neutralized. The amount (mol) of the potassium methoxide required for neutralization of the hydroxyl groups is divided by the specific amount (g) of the thermoplastic aromatic polysulfone resin.

A prepreg obtained by impregnating reinforcing fiber with a composition of such a thermoplastic aromatic polysulfone resin and an epoxy compound and curing the composition can be appropriately used in the fields of motor vehicles, aircraft, and the like. As the reinforcing fiber to be used is preferably at least one kind of reinforcing fiber selected from the group consisting of carbon fiber, glass fiber, and aramid fiber, from the viewpoint of strength, carbon fiber is more preferable. In addition, an application of the thermoplastic aromatic polysulfone resin obtained by the production method of the present invention is not limited thereto, and can be used as a coating material for members such as metal, glass, or ceramics.

<Method for Producing Epoxy Composition>

In a method for producing an epoxy composition of the present invention, the thermoplastic aromatic polysulfone resin obtained by the production method is dissolved in an epoxy compound.

The epoxy compound is not particularly limited and various kinds of epoxy compounds having an epoxy group and capable of performing ring-opening polymerization can be used.

The expression "the thermoplastic aromatic polysulfone resin is dissolved in an epoxy compound" means that the thermoplastic aromatic polysulfone resin is added to a solution containing an epoxy compound and heated to 70° C. to 170° C. to be dissolved. The solution containing an epoxy compound may contain other various additives such as a curing agent, curing accelerator, and releasing agent, in addition to the epoxy compound and the solvent.

Examples of the epoxy compound include: a glycidyl ether type epoxy compound obtained by reacting epichlorohydrin and polyhydric phenol such as bisphenol A, bisphenol F, bisphenol S, hexahydrobisphenol A, tetramethyl bisphenol A, resorcinol, cresol novolac, tetrabromobisphenol A, trihydroxybiphenyl, bisresorcinol, bisphenol hexafluoroacetone, tetramethyl bisphenol F, bixylenol, and dihydroxynaphthalene; an alicyclic glycidyl ether type epoxy compound obtained by hydrogenating the glycidyl ether type epoxy compound; a polyglycidyl ether type epoxy compound obtained by reacting epichlorohydrin and an aliphatic polyhydric alcohol such as glycerin, neopentyl glycol, ethylene glycol, propylene glycol, butylene glycol, hexylene glycol, polyethylene glycol, and polypropylene glycol; a glycidyl ester type epoxy compound obtained by reaction of epichlorohydrin and hydroxycarboxylic acid such as p-oxybenzoic acid and β-oxynaphthoic acid; a polyglycidyl ester type epoxy compound derived from polycarboxylic acid such as phthalic acid, methylphthalic acid, isophthalic acid, terephthalic acid, tetrahydrophthalic acid, hexahydrophthalic acid, endomethylenetetrahydrophthalic acid, endomethylene hexahydrophthalic acid, trimellitic acid, and polymerized fatty acid; a glycidyl aminoglycidyl ether type epoxy compound derived from aminophenol, aminoalkylphenol, and the like; a glycidyl aminoglycidyl ester type epoxy compound derived from aminobenzoic acid; and flexible epoxy resin in which a sklelton is polyether, polyurethane, polycarbonate, polyester, polyacrylic, or silicone.

<Method for Producing Cured Epoxy Product>

In a method for producing a cured epoxy product of the present invention, the epoxy composition obtained by the method for producing the epoxy composition is cured.

In the present specification, "curing" means that the viscosity or hardness of the epoxy composition increases until a specific shape can be maintained by, for example, polymerization or crosslinking reaction of the epoxy composition. In addition, in the present invention, "curing" also includes "semi-curing", that is, when in a state in which the viscosity or hardness of the epoxy composition increases until a specific shape can be maintained, the viscosity or hardness of the epoxy composition increases up to a state in which the viscosity or hardness of the epoxy composition can further increase from the former state. In the present specification, "cured epoxy product" means a product obtained by curing the epoxy composition.

Specifically the prepreg can be produced in such a manner that after an epoxy composition is diluted, as needed, with a solvent such as dimethyl sulfoxide, N,N-dimethyl formamide, N-methyl pyrrolidone, and dimethyl acetamide and a substrate is coated or impregnated with the epoxy composition, the coated or impregnated substrate is heated to 120° C. to 140° C. to semi-cure the epoxy composition in the substrate.

Examples of the substrate include woven fabric or non-woven fabric such as carbon fiber, glass fiber, and aramid fiber and flat substrates such as metal, glass, and ceramic. For example, by heating to 170° C. to 200° C. and curing using such a prepreg, a cured epoxy product having an arbitrary shape and an arbitrary form can be produced.

EXAMPLES

Hereinafter, the present invention will be described more specifically based on Examples and Comparative Examples; however, the present invention is not limited to the following Examples.

Examples 1 to 3 and Comparative Examples 1 to 6

(Method for Measuring Reduced Viscosity (RV))

Approximately 1 g of thermoplastic aromatic polysulfone resin was dissolved in N,N-dimethyl formamide to adjust the volume to 1 dL and the viscosity ($\eta$) of this solution was measured at 25° C. using an Ostwald type viscosity tube. In addition, the viscosity ($\eta 0$) of the N,N-dimethyl formamide solvent was measured at 25° C. using an Ostwald type viscosity tube. The specific viscosity (($\eta-\eta 0$)/$\eta 0$) was determined from the viscosity ($\eta$) of the solution and the viscosity ($\eta 0$) of the solvent. The specific viscosity was divided by the concentration of the solution (approximately 1 g/dL) to determine the reduced viscosity (dL/g) of the thermoplastic aromatic polysulfone resin.

(Method for Measuring Ash Content)

Approximately 5 g of the thermoplastic aromatic polysulfone resin was weighed in a platinum crucible and heated and dissolved on an electric heater. Next, the thermoplastic aromatic polysulfone resin after heating and dissolving was burned with a gas burner until the resin was carbonized, then placed in an electric furnace controlled to 800±10° C. Heating and ashing were performed until a black portion (carbonized portion) disappeared. The crucible was taken out from the electric furnace and cooled to room temperature in a desiccator. The ash content was calculated from the change in weight before and after burning.

(Measurement of Number of Terminal Hydroxyl Groups ($\mu$mol/g))

A predetermined amount of the thermoplastic aromatic polysulfone resin was dissolved in dimethyl formamide and an excess amount of p-toluene sulfonic acid was added thereto. Next, titration was performed with 0.05 mol/L of potassium methoxide/toluene-methanol solution using a potentiometric titrator to neutralize residual p-toluene sulfonic acid, and then hydroxyl groups were neutralized. The amount (mol) of potassium methoxide required for neutralization of the hydroxyl groups was divided by the predetermined amount (g) of the thermoplastic aromatic polysulfone resin, thereby determining the amount of terminal hydroxyl groups.

Example 1

Production of Thermoplastic Aromatic Polysulfone Resin in which Charging Molar Ratio of Bis(4-Chlorophenyl) Sulfone (Component (A)), Bis(4-Hydroxyphenyl) Sulfone (Component (B)), and Potassium Carbonate (Component (C)) Satisfies A/B=0.920 and C/B=0.923

Bis(4-hydroxyphenyl) sulfone (300.3 g), bis(4-chlorophenyl) sulfone (317.0 g), and diphenyl sulfone (548.4 g) as a polymerization solvent were charged into a polymerization tank including a stirrer, a nitrogen inlet tube, a thermometer, and a condenser having a receiver at the tip thereof and the temperature was raised to 180° C. while flowing nitrogen gas into the system. After potassium carbonate (153.1 g) was added to the obtained solution, the temperature was gradually raised to 290° C. The reaction was further carried out for 3 hours at 290° C. The obtained reaction liquid was cooled to room temperature and solidified and finely pulverized. Then, washing with warm water and washing with a mixed solvent of acetone and methanol were performed several times. Next, heating and drying were performed at 150° C. to obtain thermoplastic aromatic polysulfone resin as a powder. The reduced viscosity (Rv), the ash content, and the number of terminal hydroxyl groups (terminal OH amount) of the obtained thermoplastic aromatic polysulfone resin were measured. The results are shown in Table 1.

Example 2

Production of Thermoplastic Aromatic Polysulfone Resin in which Charging Molar Ratio of Bis(4-Chlorophenyl) Sulfone (Component (A)), Bis(4-Hydroxyphenyl) Sulfone (Component (B)), and Potassium Carbonate (Component (C)) Satisfies A/B=0.940 and C/B=0.943

The same operation as in Example 1 was carried out except for setting the charging amount of raw materials to bis(4-hydroxyphenyl) sulfone (300.3 g), bis(4-chlorophenyl) sulfone (323.9 g), diphenyl sulfone (554.4 g) as a polymerization solvent, and potassium carbonate (156.4 g) in Example 1. Rv, the ash content, and the terminal OH amount were measured. The results are shown in Table 1.

Example 3

Production of Thermoplastic Aromatic Polysulfone Resin in which Charging Molar Ratio of Bis(4-Chlorophenyl) Sulfone (Component (A)), Bis(4-Hydroxyphenyl) Sulfone (Component (B)), and Potassium Carbonate (Component (C)) Satisfies A/B=0.962 and C/B=0.965

The same operation as in Example 1 was carried out except for setting the charging amount of raw materials to bis(4-hydroxyphenyl) sulfone (300.3 g), bis(4-chlorophenyl) sulfone (331.5 g), diphenyl sulfone (560.9 g) as a polymerization solvent, and potassium carbonate (160.1 g) in Example 1. Rv, the ash content, and the terminal OH amount were measured. The results are shown in Table 1.

Example 4

Production of Thermoplastic Aromatic Polysulfone Resin in which Charging Molar Ratio of Bis(4-Chlorophenyl) Sulfone (Component (A)), Bis(4-Hydroxyphenyl) Sulfone (Component (B)), and Potassium Carbonate (Component (C)) Satisfies A/B=0.910 and C/B=0.913

Bis(4-hydroxyphenyl) sulfone (300.3 g), bis(4-chlorophenyl) sulfone (313.6 g), and diphenyl sulfone (545.4 g) as a polymerization solvent were charged into a polymerization tank including a stirrer, a nitrogen inlet tube, a thermometer, and a condenser having a receiver at the tip thereof and the temperature was raised to 180° C. while flowing the nitrogen gas into the system. After potassium carbonate (151.4 g) was added to the obtained solution, the temperature was gradually raised to 290° C. The reaction was further carried out for 3 hours at 290° C. The obtained reaction liquid was cooled to room temperature and solidified and finely pulverized. Then, washing with warm water and washing with a mixed solvent of acetone and methanol were performed several times. Next, heating and drying were performed at 150° C. to obtain thermoplastic aromatic polysulfone resin as a powder. The reduced viscosity (Rv), the ash content, and the number of terminal hydroxyl groups (terminal OH amount) of the obtained thermoplastic aromatic polysulfone resin were measured. The results are shown in Table 1.

Example 5

Production of Thermoplastic Aromatic Polysulfone Resin in which Charging Molar Ratio of Bis(4-Chlorophenyl) Sulfone (Component (A)), Bis(4-Hydroxyphenyl) Sulfone (Component (B)), and Potassium Carbonate (Component (C)) Satisfies A/B=0.930 and C/B=0.933

Bis(4-hydroxyphenyl) sulfone (300.3 g), bis(4-chlorophenyl) sulfone (320.5 g), and diphenyl sulfone (551.4 g) as a polymerization solvent were charged into a polymerization tank including a stirrer, a nitrogen inlet tube, a thermometer, and a condenser having a receiver at the tip thereof and the temperature was raised to 180° C. while flowing the nitrogen gas into the system. After potassium carbonate (154.7 g) was added to the obtained solution, the temperature was gradually raised to 290° C. The reaction was further carried out for 3 hours at 290° C. The obtained reaction liquid was cooled to room temperature and solidified and finely pulverized. Then, washing with warm water and washing with a mixed solvent of acetone and methanol were performed several times. Next, heating and drying were performed at 150° C. to obtain thermoplastic aromatic polysulfone resin as a powder. The reduced viscosity (Rv), the ash content, and the number of terminal hydroxyl groups (terminal OH amount) of the obtained thermoplastic aromatic polysulfone resin were measured. The results are shown in Table 1.

Comparative Example 1

Production of Thermoplastic Aromatic Polysulfone Resin in which Charging Molar Ratio of Bis(4-Chlorophenyl) Sulfone (Component (A)), Bis(4-Hydroxyphenyl) Sulfone (Component (B)), and Potassium Carbonate (Component (C)) Satisfies A/B=1.060 and C/B=1.040

The same operation as in Example 1 was carried out except for setting the charging amount of raw materials to bis(4-hydroxyphenyl) sulfone (300.3 g), bis(4-chlorophenyl) sulfone (365.3 g), diphenyl sulfone (594.0 g) as a polymerization solvent, and potassium carbonate (172.5 g) in Example 1. Rv, the ash content, and the terminal OH amount were measured. The results are shown in Table 1.

Comparative Example 2

Production of Thermoplastic Aromatic Polysulfone Resin in which Charging Molar Ratio of Bis(4-Chlorophenyl) Sulfone (Component (A)), Bis(4-Hydroxyphenyl) Sulfone (Component (B)), and Potassium Carbonate (Component (C)) Satisfies A/B=1.060 and C/B=1.040

The same operation as in Example 1 was carried out except for setting the charging amount of raw materials to bis(4-hydroxyphenyl) sulfone (300.3 g), bis(4-chlorophenyl) sulfone (365.3 g), diphenyl sulfone (600.7 g) as a polymerization solvent, and potassium carbonate (165.9 g) in Example 1. Rv, the ash content, and the terminal OH amount were measured. The results are shown in Table 1.

Comparative Example 3

Production of Thermoplastic Aromatic Polysulfone Resin in which Charging Molar Ratio of Bis(4-Chlorophenyl) Sulfone (Component (A)), Bis(4-Hydroxyphenyl) Sulfone (Component (B)), and Potassium Carbonate (Component (C)) Satisfies A/B=1.080 and C/B=1.000

The same operation as in Example 1 was carried out except for setting the charging amount of raw materials to bis(4-hydroxyphenyl) sulfone (300.3 g), bis(4-chlorophenyl) sulfone (372.2 g), diphenyl sulfone (610.0 g) as a polymerization solvent, and potassium carbonate (165.9 g) in Example 1. Rv, the ash content, and the terminal OH amount were measured. The results are shown in Table 1.

Comparative Example 4

Production of Thermoplastic Aromatic Polysulfone Resin in which Charging Molar Ratio of Bis(4-Chlorophenyl) Sulfone (Component (A)), Bis(4-Hydroxyphenyl) Sulfone (Component (B)), and Potassium Carbonate (Component (C)) Satisfies A/B=1.110 and C/B=1.000

The same operation as in Example 1 was carried out except for setting the charging amount of raw materials to bis(4-hydroxyphenyl) sulfone (300.3 g), bis(4-chlorophenyl) sulfone (382.5 g), diphenyl sulfone (623.9 g) as a polymerization solvent, and potassium carbonate (165.9 g) in Example 1. Rv, the ash content, and the terminal OH amount were measured. The results are shown in Table 1.

Comparative Example 5

Production of Thermoplastic Aromatic Polysulfone Resin in which Charging Molar Ratio of Bis(4-Chlorophenyl) Sulfone (Component (A)), Bis(4-Hydroxyphenyl) Sulfone (Component (B)), and Potassium Carbonate (Component (C)) Satisfies A/B=0.990 and C/B=1.020

The same operation as in Example 1 was carried out except for setting the charging amount of raw materials to bis(4-hydroxyphenyl) sulfone (300.3 g), bis(4-chlorophenyl) sulfone (341.2 g), diphenyl sulfone (564.8 g) as a polymerization solvent, and potassium carbonate (169.2 g) in Example 1. Rv, the ash content, and the terminal OH amount were measured. The results are shown in Table 1.

Comparative Example 6

Production of Thermoplastic Aromatic Polysulfone Resin in which Charging Molar Ratio of Bis(4-Chlorophenyl) Sulfone (Component (A)), Bis(4-Hydroxyphenyl) Sulfone (Component (B)), and Potassium Carbonate (Component (C)) Satisfies A/B=0.985 and C/B=1.020

The same operation as in Example 1 was carried out except for setting the charging amount of raw materials to bis(4-hydroxyphenyl) sulfone (300.3 g), bis(4-chlorophenyl) sulfone (339.4 g), diphenyl sulfone (562.5 g) as a polymerization solvent, and potassium carbonate (169.2 g) in Example 1. Rv, the ash content, and the terminal OH amount were measured. The results are shown in Table 1.

TABLE 1

| | Charging ratio | | | Ash content | OH terminal |
|---|---|---|---|---|---|
| | A/B | C/B | RV | (%) | (μmol/g) |
| Example 1 | 0.920 | 0.923 | 0.20 | 0.26 | 289 |
| Example 2 | 0.940 | 0.943 | 0.22 | 0.22 | 239 |
| Example 3 | 0.962 | 0.965 | 0.27 | 0.24 | 169 |
| Example 4 | 0.910 | 0.913 | 0.19 | 0.27 | 313 |
| Example 5 | 0.930 | 0.933 | 0.21 | 0.28 | 267 |
| Comparative Example 1 | 1.060 | 1.040 | 0.30 | 0.04 | 3 |
| Comparative Example 2 | 1.060 | 1.000 | 0.24 | 0.02 | 42 |
| Comparative Example 3 | 1.080 | 1.000 | 0.20 | 0.02 | 37 |
| Comparative Example 4 | 1.110 | 1.000 | 0.18 | <0.02 | 30 |
| Comparative Example 5 | 0.990 | 1.020 | 0.41 | 0.47 | 61 |
| Comparative Example 6 | 0.985 | 1.020 | 0.37 | 0.69 | 75 |

As is apparent from the results shown in Table 1, the thermoplastic aromatic polysulfone resins of Examples 1 to 5 obtained by the production method of the present invention had a significantly higher ratio of terminal hydroxyl groups compared to the thermoplastic aromatic polysulfone resins of Comparative Examples 1 to 6. Since the terminal OH ratio is 150 μmol/g or higher, the resins of the present invention favorably react with the epoxy resin.

In addition, the thermoplastic aromatic polysulfone resins obtained in Examples 1 to 5 had suitably reduced viscosity of 0.19 or higher and 0.27 or lower together with a suitable ash amount of 0.5% or less.

Examples 6 and 7 and Comparative Examples 7 and 8

(Viscosity of PES/Epoxy Solution)

Figure 1:
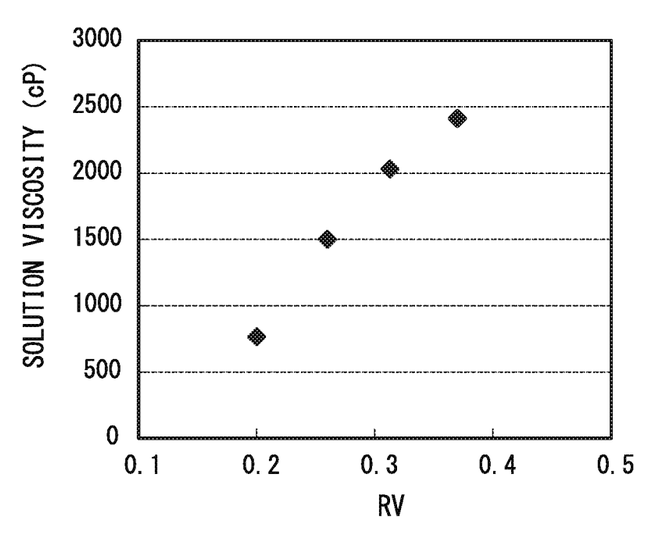
FIG. 1 is a graph showing a relationship between reduced viscosity and solution viscosity in Examples 6 and 7, and Comparative Examples 9 and 10.

20 g of the thermoplastic aromatic polysulfone resin (hereinafter, also referred to as PES in some cases) prepared in each of the above examples was added to epoxy resin ELM-100 (180 g) (manufactured by Sumitomo Chemical Co., Ltd). The solution was stirred for 1 hour while heating at 100° C. and the PES was dissolved in the epoxy resin. The obtained solution was maintained at 60° C. and the solution viscosity was measured with a B type viscometer. The measurement results of solution viscosity are shown in Table 2 and a graph showing the relationship between the solution viscosity and the RV is shown in FIG. 1.

TABLE 2

| | PES | RV | PES concentration (wt %) | Solution viscosity at 60° C. (cP.) |
|---|---|---|---|---|
| Example 6 | Example 1 | 0.260 | 10 | 1500 |
| Example 7 | Example 2 | 0.200 | 10 | 766 |
| Comparative Example 7 | Comparative Example 1 | 0.390 | 10 | 2410 |
| Comparative Example 8 | Comparative Example 2 | 0.313 | 10 | 2030 |

As is apparent from the results shown in Table 2, the thermoplastic aromatic polysulfone resins obtained by the production method of the present invention could achieve a low solution viscosity of 1600 cP or lower even when the solution was obtained by mixing with epoxy resin. In addition, from the graph shown in FIG. 1, it could be confirmed that the viscosity of the mixed solution was substantially proportional to the RV of the thermoplastic aromatic polysulfone resin.

Examples 8 and 9 and Comparative Example 9

(Solubility of PES in Epoxy Resin)

10 wt % of PES having RV shown in Table 3 was added to epoxy resin ELM-100. Results obtained by performing heating and stirring at 120° C. to visually evaluate the time until particles were completely dissolved are shown in Table 3. The PES used in Examples 8 and 9 is PES obtained by the production method of the present invention and the PES used in Comparative Example 9 is the PES obtained by a method other than that of the present invention.

TABLE 3

| | RV | PES concentration (wt %) | Dissolution time (min) |
|---|---|---|---|
| Example 8 | 0.25 | 10 | 49 |
| Example 9 | 0.20 | 10 | 45 |
| Comparative Example 9 | 0.35 | 10 | 85 |

As is apparent from the results shown in Table 3, the lower the RV, the shorter the time to dissolution. In Example 8 in which RV=0.25, the time to dissolution was shortened by approximately 40% compared to Comparative Example 9 in which RV=0.35. Accordingly, it could be confirmed that solubility in epoxy is greatly improved by lowering RV.

Example 10 and Comparative Example 10

(Curing of PES/Epoxy Solution Composition)

4,4-Diaminodiphenyl sulfone (70 g) as a curing agent was added to the epoxy solution composition (200 g) obtained in Example 8, and was heated in an oven for 2 hours at 180° C. to be cured. Results obtained by evaluating the glass transition temperature of the obtained cured product by DSC are shown in Table 4 as Example 10.

In addition, results obtained by evaluating the glass transition temperature by performing curing in the same manner as in the epoxy solution composition obtained in Comparative Example 9 are shown in Table 4 as Comparative Example 10.

It could be confirmed that the solubility in epoxy is improved by lowering RV of PES; however, the glass transition temperature of the composition did not change.

TABLE 4

| | PES | | Weight of epoxy | Weight of curing agent | Glass transition temperature of cured product (° C.) |
|---|---|---|---|---|---|
| | RV | Weight | | | |
| Example 10 | 0.25 | 20 g | 180 g | 70 g | 234 |
| Comparative Example 10 | 0.35 | 20 g | 180 g | 70 g | 234 |

INDUSTRIAL APPLICABILITY

According to the present invention, thermoplastic aromatic polysulfone resin having a sufficient number of phenolic hydroxyl groups and a low reduced viscosity can be produced without adding an acid or adding a process due to a hydroxyl group conversion process.

The invention claimed is:

1. A method for producing thermoplastic aromatic polysulfone resin, comprising:

performing polymerization reaction of compound (A), a dihalogeno compound represented by Formula (I), compound (B), a divalent phenol represented by Formula (II), and compound (C), an alkali metal carbonate, in an organic solvent at a charging molar ratio satisfying the following Formulae (1) to (3):

$0.910 \leq (A)/(B) \leq 0.962$; (1)

$\{(A)/(B)\}-0.02 < (C)/(B) < \{(A)/(B)\}+0.01$, and; (2)

$(C)/(B) < 1.00$; (3)

(I)

(II)

wherein in Formulae (I) and (II), $R^1$ to $R^4$ each independently represents an alkyl group having 1 to 4 carbon atoms or an alkoxy group having 1 to 4 carbon atoms, X and X' each independently represents a halogen atom, Y represents one or more groups selected from the group consisting of —$SO_2$—, —$C(CH_3)_2$—, —$CH_2$—, —O— and —CO—, or a single bond, and n1, n2, n3 and n4 each independently represents an integer of 0 to 4, and in a case where n1, n2, n3 or n4 is an integer of 2 to 4, a plurality of $R^1$, $R^2$, $R^3$ or $R^4$ may be the same as or different from each other.

2. The method according to claim 1, wherein Formula (1) is $0.910 \leq (A)/(B) \leq 0.950$.

3. The method according to claim 1, wherein Formula (1) is $0.910 \leq (A)/(B) \leq 0.930$.

4. The method according to claim 1, wherein n1 to n4 are 0.

5. The method according to claim 1, wherein X and X' are chlorine atoms.

6. The method according to claim 1, wherein the organic solvent is a polar organic solvent.

* * * * *